(12) United States Patent
Kawaai et al.

(10) Patent No.: US 10,284,302 B2
(45) Date of Patent: May 7, 2019

(54) OPTICAL TRANSMITTER

(71) Applicant: FUJITSU LIMITED, Kawasaki-shi, Kanagawa (JP)

(72) Inventors: Shigeki Kawaai, Kawasaki (JP); Yoshiharu Yoshizawa, Kawasaki (JP); Manabu Yamazaki, Fuchu (JP); Daisuke Usui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/987,203

(22) Filed: May 23, 2018

(65) Prior Publication Data

US 2018/0343064 A1 Nov. 29, 2018

(30) Foreign Application Priority Data

May 26, 2017 (JP) ................................ 2017-104567

(51) Int. Cl.
*H04B 10/516* (2013.01)

(52) U.S. Cl.
CPC ................................ *H04B 10/516* (2013.01)

(58) Field of Classification Search
CPC ................. G02F 1/0121; G02F 1/2257; G02F 2001/0152; H04B 10/5051; H04B 10/5053; H04B 10/5055; H04B 10/516
See application file for complete search history.

(56) References Cited

U.S. PATENT DOCUMENTS

| | | | | |
|---|---|---|---|---|
| 2009/0323164 A1* | 12/2009 | Miyazaki | ............... | G02F 1/225 359/279 |
| 2011/0044573 A1* | 2/2011 | Webster | ............... | G02F 1/0121 385/3 |
| 2012/0155880 A1* | 6/2012 | Nishimoto | ....... | H04B 10/50572 398/79 |
| 2017/0052394 A1* | 2/2017 | Goodwill | ............... | G02F 1/011 |

FOREIGN PATENT DOCUMENTS

JP 2013-502613 1/2013

* cited by examiner

*Primary Examiner* — David C Payne
*Assistant Examiner* — Omar S Ismail
(74) *Attorney, Agent, or Firm* — Staas & Halsey LLP

(57) ABSTRACT

An optical transmitter includes an optical modulator that includes a first phase shifter for a most significant bit, a second phase shifter for a least significant bit, and a third phase shifter for fine adjustment, the first phase shifter, the second phase shifter, and the third phase shifter are disposed along an optical waveguide, and a drive circuit that includes a first driver that drives the first phase shifter, a second driver that drives the second phase shifter, and a third driver that drives the third phase shifter, wherein a drive polarity of the third driver is adjustable in a positive direction and a negative direction, and the third phase shifter adjusts an amount of phase change of the optical modulator in a positive direction or a negative direction based on a drive voltage inputted from the third driver.

3 Claims, 16 Drawing Sheets

V1 : → UPPER ARM OPERATION
V2 : → LOWER ARM OPERATION
V3 : → AFTER OPERATIONAL SYNTHESIS

FINE ADJUSTMENT OF AMOUNT OF PHASE SHIFT IN NEGATIVE DIRECTION

FINE ADJUSTMENT OF AMOUNT OF PHASE SHIFT IN POSITIVE DIRECTION

FIG. 4

| SIGNAL LEVEL | PHASE SHIFTER FOR LSB | PHASE SHIFTER FOR LSB' | PHASE SHIFTER FOR MSB | AMOUNT OF PHASE SHIFT |
|---|---|---|---|---|
| 11 | ON | OFF | ON | $200 \times \phi$ |
| 10 | OFF | OFF | ON | $1.33 \times \phi$ |
| 01 | OFF | ON | OFF | $0.66 \times \phi$ |
| 00 | OFF | OFF | OFF | $0 \times \phi$ |

FIG. 7

| SIGNAL LEVEL | PHASE SHIFTER FOR LSB | PHASE SHIFTER FOR MSB | PHASE SHIFTER 25 FOR FINE ADJUSTMENT | PHASE SHIFTER 26 FOR FINE ADJUSTMENT | AMOUNT OF PHASE SHIFT |
|---|---|---|---|---|---|
| 11 | ON | ON | OFF | OFF | $200 \times \phi$ |
| 10 | OFF | ON | ON | ON | $(1.39-0.06) \times \phi$ |
| 01 | ON | OFF | ON | OFF | $(0.69-0.03) \times \phi$ |
| 00 | OFF | OFF | OFF | OFF | $0 \times \phi$ |

FIG. 8
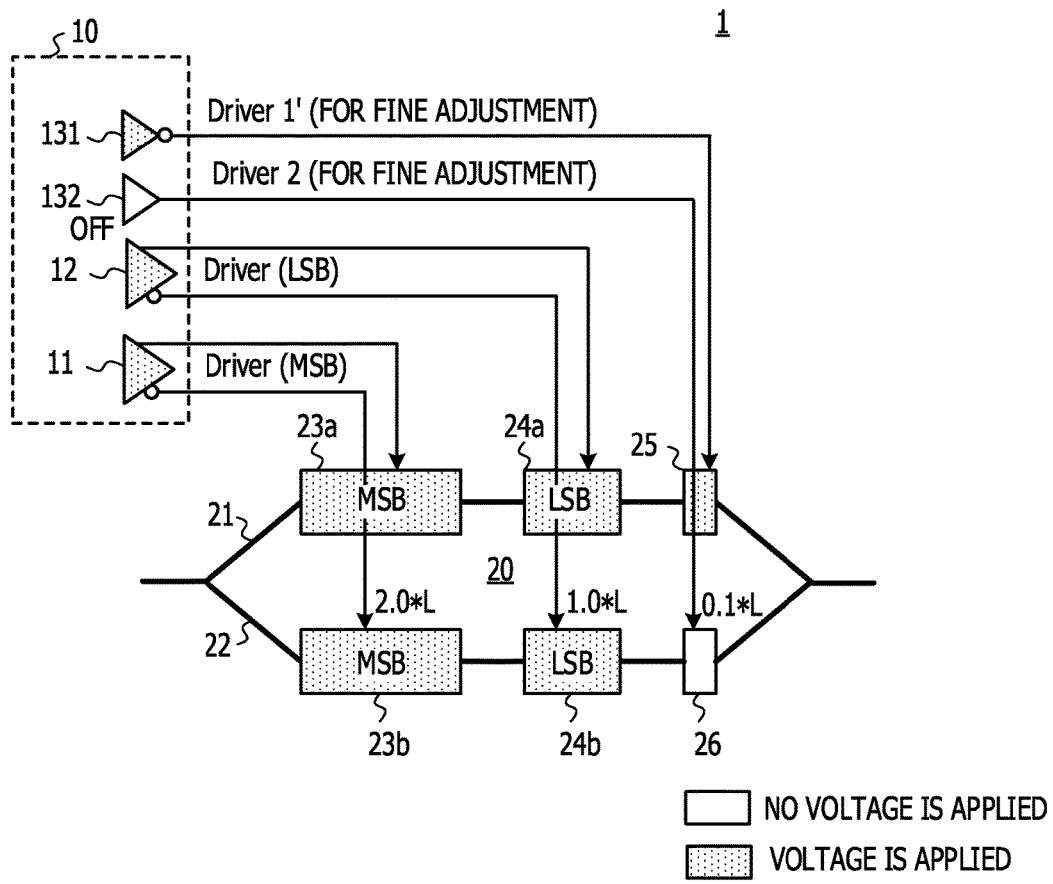
V1 : → UPPER ARM OPERATION
V2 : → LOWER ARM OPERATION
V3 : → AFTER OPERATIONAL SYNTHESIS
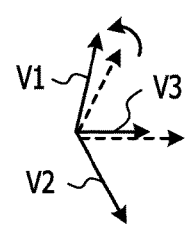
FINE ADJUSTMENT OF
AMOUNT OF PHASE SHIFT IN
NEGATIVE DIRECTION
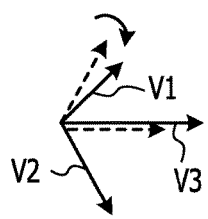
FINE ADJUSTMENT OF
AMOUNT OF PHASE SHIFT
IN POSITIVE DIRECTION

FIG. 12A

| OUTPUT LEVEL (LOGICAL VALUE) | INPUT VOLTAGE | AMOUNT OF PHASE CHANGE | OPTICAL OUTPUT | Δ AMOUNT OF PHASE CHANGE | Δ OPTICAL OUTPUT |
|---|---|---|---|---|---|
| 11 | 0.777 | 5.09 | 1.000 | - | - |
| 10 | 0.595 | 4.23 | 0.838 | 0.865 | 0.161 |
| 01 | 0.413 | 3.19 | 0.355 | 1.038 | 0.483 |
| 00 | 0.231 | 1.94 | 0.000 | 1.245 | 0.355 |

FIG. 12B

| OUTPUT LEVEL (LOGICAL VALUE) | INPUT VOLTAGE | AMOUNT OF PHASE CHANGE | OPTICAL OUTPUT | Δ AMOUNT OF PHASE CHANGE | Δ OPTICAL OUTPUT |
|---|---|---|---|---|---|
| 11 | 0.777 | 5.09 | 1.000 | - | - |
| 10 | 0.520 | 3.82 | 0.666 | 1.270 | 0.334 |
| 01 | 0.406 | 3.14 | 0.334 | 0.677 | 0.332 |
| 00 | 0.231 | 1.94 | 0.000 | 1.201 | 0.334 |

FIG. 14

| SIGNAL LEVEL | PHASE SHIFTER FOR LSB | PHASE SHIFTER FOR MSB | PHASE SHIFTER PS1 FOR FINE ADJUSTMENT | PHASE SHIFTER PS1' FOR FINE ADJUSTMENT | PHASE SHIFTER PS2 FOR FINE ADJUSTMENT | PHASE SHIFTER PS2' FOR FINE ADJUSTMENT |
|---|---|---|---|---|---|---|
| 11 | ON | ON | OFF (REVERSE) | OFF (REVERSE) | OFF (REVERSE) | OFF (REVERSE) |
| 10 | OFF | ON | ON (REVERSE) | ON (REVERSE) | ON (REVERSE) | ON (REVERSE) |
| 01 | ON | OFF | OFF (REVERSE) | OFF (REVERSE) | ON (REVERSE) | ON (REVERSE) |
| 00 | OFF | OFF | OFF (REVERSE) | OFF (REVERSE) | OFF (REVERSE) | OFF (REVERSE) |

FIG. 16

| SIGNAL LEVEL | PHASE SHIFTER FOR LSB | PHASE SHIFTER FOR MSB | PHASE SHIFTER #1 FOR FINE ADJUSTMENT | PHASE SHIFTER #1' FOR FINE ADJUSTMENT | PHASE SHIFTER #2 TO #5 FOR FINE ADJUSTMENT | PHASE SHIFTER #2' TO #5' FOR FINE ADJUSTMENT |
|---|---|---|---|---|---|---|
| 11 | ON | ON | OFF (REVERSE) | OFF (REVERSE) | OFF (REVERSE) | OFF (REVERSE) |
| 10 | OFF | ON | OFF (REVERSE) | ON (REVERSE) | ON (REVERSE) | ON (REVERSE) |
| 01 | ON | OFF | ON (REVERSE) | OFF (REVERSE) | OFF (REVERSE) | OFF (REVERSE) |
| 00 | OFF | OFF | OFF (REVERSE) | OFF (REVERSE) | OFF (REVERSE) | OFF (REVERSE) |

OPTICAL TRANSMITTER

CROSS-REFERENCE TO RELATED APPLICATION

This application is based upon and claims the benefit of priority of the prior Japanese Patent Application No. 2017-104567, filed on May 26, 2017, the entire contents of which are incorporated herein by reference.

FIELD

The embodiment discussed herein is related to an optical transmitter.

BACKGROUND

In order to perform large capacity data communication over a short distance or a medium distance such as a distance between server boards or between network devices, optical interconnect technique using an optical transceiver module is being adopted. When a data rate higher than 200 Gbps (50 Gbps×4 lanes) as in 200 GBASE-DR4 standard is achieved, the data rate per lane exceeds 50 Gbps. It is difficult to achieve such mass transmission by non-return-to-zero (NRZ) scheme that performs two-level symbol transmission, and multi-level optical transmission such as 4-level pulse amplitude modulation (PAM-4) is called for.

In order to perform communication with PAM-4 signal over a distance of 500 m or longer, external modulation system in which an external modulator modulates light from a light source has been changed over from direct modulation system in which on and off of a laser represents an optical signal. As an external modulator, what draws attention is a small-size MZ modulator which is formed by using silicon photonics technology. In an MZ modulator, an optical coupler splits light from a light source into optical signals, and then the optical signals in upper and lower arms are provided with a phase difference by phase shifters of the upper and lower arms with application of an electrical signal thereto to produce output light with low or high intensity.

A silicon-based optical modulator has a configuration in which a modulator arm includes M separated segments, and N-bit input data signal is converted to multiple M drive signals for the M modulation segments ($M \geq 2^N/2$).

As illustrated in FIG. 1, for an optical modulator using silicon photonics technology or an optical modulator formed by a semiconductor optical waveguide of another technique, a phase difference between arms varies non-linearly with an inputted electrical signal. In FIG. 1, the horizontal axis indicates input voltage, and the vertical axis indicates amount of phase shift (rad). For instance, when four levels are respectively represented by four voltage levels, the greater the input voltage is, the more deviation occurs from linear characteristics. Therefore, as illustrated in FIG. 2, the characteristics of optical output with respect to input voltage of an MZ modulator does not form a sine wave, and even if input voltage is controlled to rise and fall at regular intervals, opening of the eye pattern of optical signals is non-uniform due to amplitude distortion.

When each arm of the MZ modulator is provided with multiple segments to cope with the problem of non-linearity, loss increases according to the length of the segments. As an output of LD is increased in order to compensate the loss, power consumption increases. In addition, the power consumption also increases by driving the same number of drivers as the number of the segments.

The following is a reference document.
[Document 1] Japanese National Publication of International Patent Application No. 2013-502613.

SUMMARY

According to an aspect of the invention, an optical transmitter includes an optical modulator that includes a first phase shifter for a most significant bit, a second phase shifter for a least significant bit, and a third phase shifter for fine adjustment, the first phase shifter, the second phase shifter, and the third phase shifter are disposed along an optical waveguide, and a drive circuit that includes a first driver that drives the first phase shifter, a second driver that drives the second phase shifter, and a third driver that drives the third phase shifter, wherein a drive polarity of the third driver is adjustable in a positive direction and a negative direction, and the third phase shifter adjusts an amount of phase change of the optical modulator in a positive direction or a negative direction based on a drive voltage inputted from the third driver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table illustrating drive control of an optical modulator when four levels are achieved by the configuration of FIG. 3;

FIG. 7 is a table illustrating drive control of the optical modulator when four levels are achieved by the configuration of FIG. 6;

FIG. 8 is a diagram illustrating control of optical output power by a phase shifter for fine adjustment;

FIGS. 12A and 12B are each a table illustrating parameters of the optical modulator before adjustment of input voltage and after adjustment of input voltage;

FIG. 14 is a table illustrating drive control of the optical modulator when four levels are achieved by the configuration of FIG. 13;

FIG. 16 is a table illustrating drive control of the optical modulator when four levels are achieved by the configuration of FIG. 15.

DESCRIPTION OF EMBODIMENT

In an embodiment, amplitude distortion caused by non-linearity of phase characteristics with respect to input voltage in multi-level modulation such as PAM-4, PAM-8, PAM-16, and 16 QAM, 64 QAM is compensated by a relatively low power consumption, and quality of optical communication is maintained favorable. Specifically, a phase shifter for fine adjustment is disposed in at least one optical waveguide of a Mach-Zehnder (MZ) optical modulator, and the drive direction of the phase shifter for fine adjustment is made adjustable in both a positive direction and a negative direction, and thus non-linear characteristics of the optical modulator is compensated by a relatively small power consumption.

<Configuration Devised in Process Leading to Embodiment>

Figure 2:
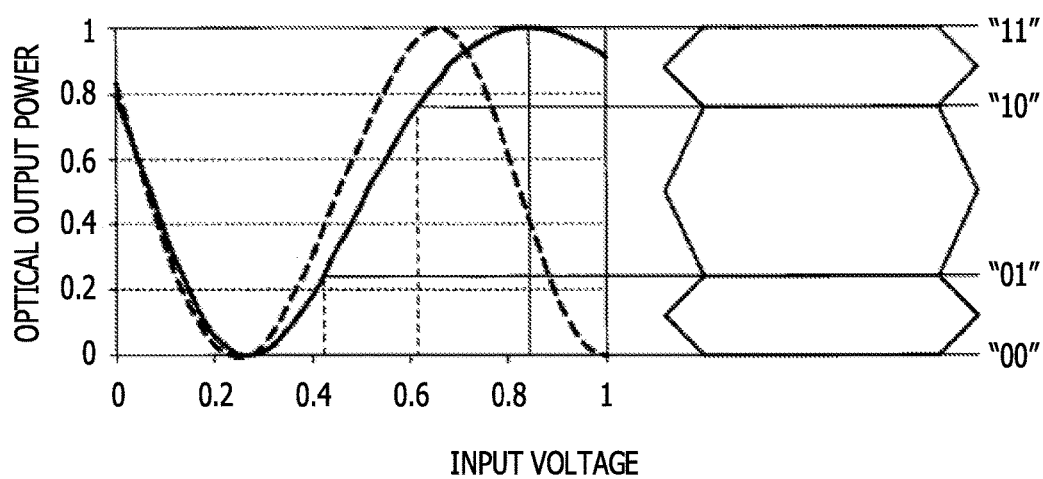
FIG. 2 is a graph illustrating a relationship between input voltage and optical output power of the optical modulator using silicon photonics technology.
Figure 3:
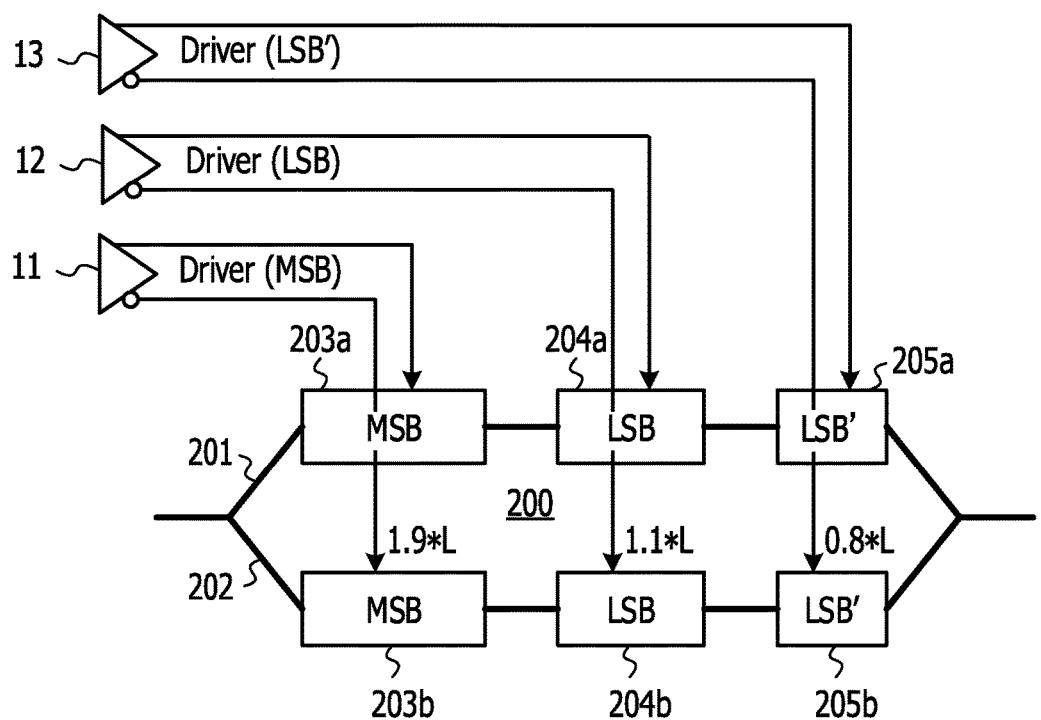
FIG. 3 is a diagram illustrating a configuration of an optical modulator which may be devised in a process leading to the configuration of an embodiment.

FIG. 3 is a diagram illustrating a configuration of an optical modulator which may be devised in a process leading to the configuration of an embodiment. When a uniform eye pattern is achieved by multi-level modulation, a phase shifter is installed to obtain a desired optical output power. A ratio of lengths of phase shifters is determined in anticipation of drop in the amount of phase shift at "11" level (a level corresponding to an input voltage of 0.85 in FIG. 1). In order to adjust intermediate levels ("10" level and "01" level) of FIG. 2 to a desired optical output power, in addition to a phase shifter for most significant bit (MSB), two types of phase shifters are used, which are a phase shifter for least significant bit (LSB), and a phase shifter for LSB'.

In an upper arm including one optical waveguide 201 of an MZ optical modulator 200, a phase shifter 203a for MSB, a phase shifter 204a for LSB, and additional phase shifter 205a for LSB' are disposed. In a lower arm including an optical waveguide 202, a phase shifter 203b for MSB, a phase shifter 204b for LSB, and a phase shifter 205b for LSB' are disposed.

The phase shifters 203a and 203b for MSB are driven by a normal phase output and a reversed output of a driver 11. The phase shifters 204a and 204b for LSB are driven by a normal phase output and a reversed output of a driver 12. The phase shifters 205a and 205b for LSB' are driven by a normal phase output and a reversed output of a driver 13.

When a logical value "11" level is achieved, the phase shifter for MSB and the phase shifter for LSB are driven. When a logical value "10" level is achieved, only the phase shifter for MSB is driven. When a logical value "01" level is achieved, only the phase shifter for LSB' is driven. When a logical value "00" level is achieved, all of the phase shifters are turned off.

Figure 1:
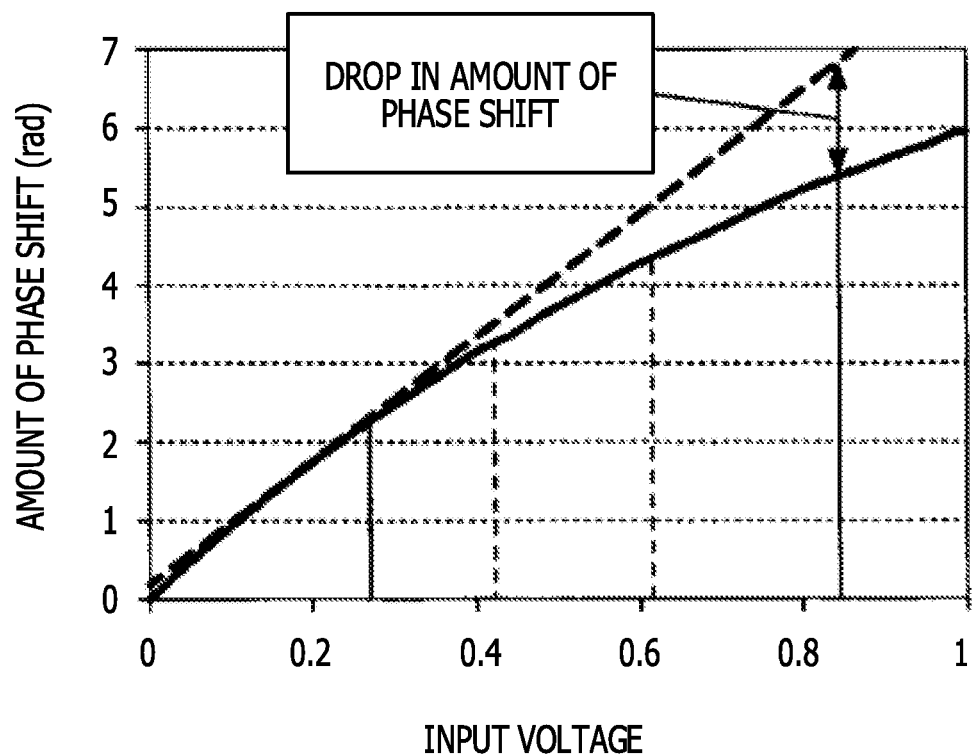
FIG. 1 is a graph illustrating a relationship between input voltage and amount of phase shift of an optical modulator using silicon photonics technology.

For output of "01" level in which drop ("bow") in the amount of phase change is small in the curve of phase characteristics with respect to input voltage of FIG. 1, the phase shifters 205a, 205b for LSB' are driven, and for output of "11" level, the phase shifters 204a, 204b for LSB are driven, which achieve the amount of phase shift in anticipation of drop. Thus, the non-linearity of the silicon waveguide MZ modulator is compensated.

In the optical modulator 200, let L be the unit waveguide length for achieving the amount of phase shift which allows an optical output to change from a minimum to a maximum, then in order to achieve four levels in the optical modulator having non-linear characteristics of FIG. 1, for instance, the length of the phase shifters 203a, 203b for MSB is set to 1.9×L, and the length of the phase shifters 204a, 204b for LSB is set to 1.1×L. The ratio of the length of the phase shifters 203a, 203b for MSB to the length of the phase shifters 204a, 204b for LSB is set in anticipation of the drop (6.8 rad-5.3 rad) of the amount of phase change at "11" level. In contrast, since the drop in the amount of phase change at "01" level is small, the length of the phase shifters 205a, 205b for LSB' is set to (5.3/6.8) times the length of the phase shifters 204a, 204b for LSB, that is, 0.8×L.

FIG. 4 is a table illustrating drive control of the optical modulator when four levels are achieved by the configuration of FIG. 3. Four signal levels "11", "10", "01", and "00" are achieved by combining drive of the phase shifter for MSB, the phase shifter for LSB, and the phase shifter for LSB'. For output of "11" level, the phase shifter for LSB is turned ON, and for output of "01" level, the phase shifter for LSB' is turned ON, thus the amount of phase change is substantially uniform between four levels. In this example, the amount of phase shift at "00" level is 0×φ, the amount of phase shift at "01" level is 0.66×φ, the amount of phase shift at "10" level is 1.33×φ, and the amount of phase shift at "11" level is 2.00×φ, where "φ" is the phase difference between two waveguides when the optical output level is changed from a minimum to a maximum, and "φ" may be considered to be "π".

Figure 5:
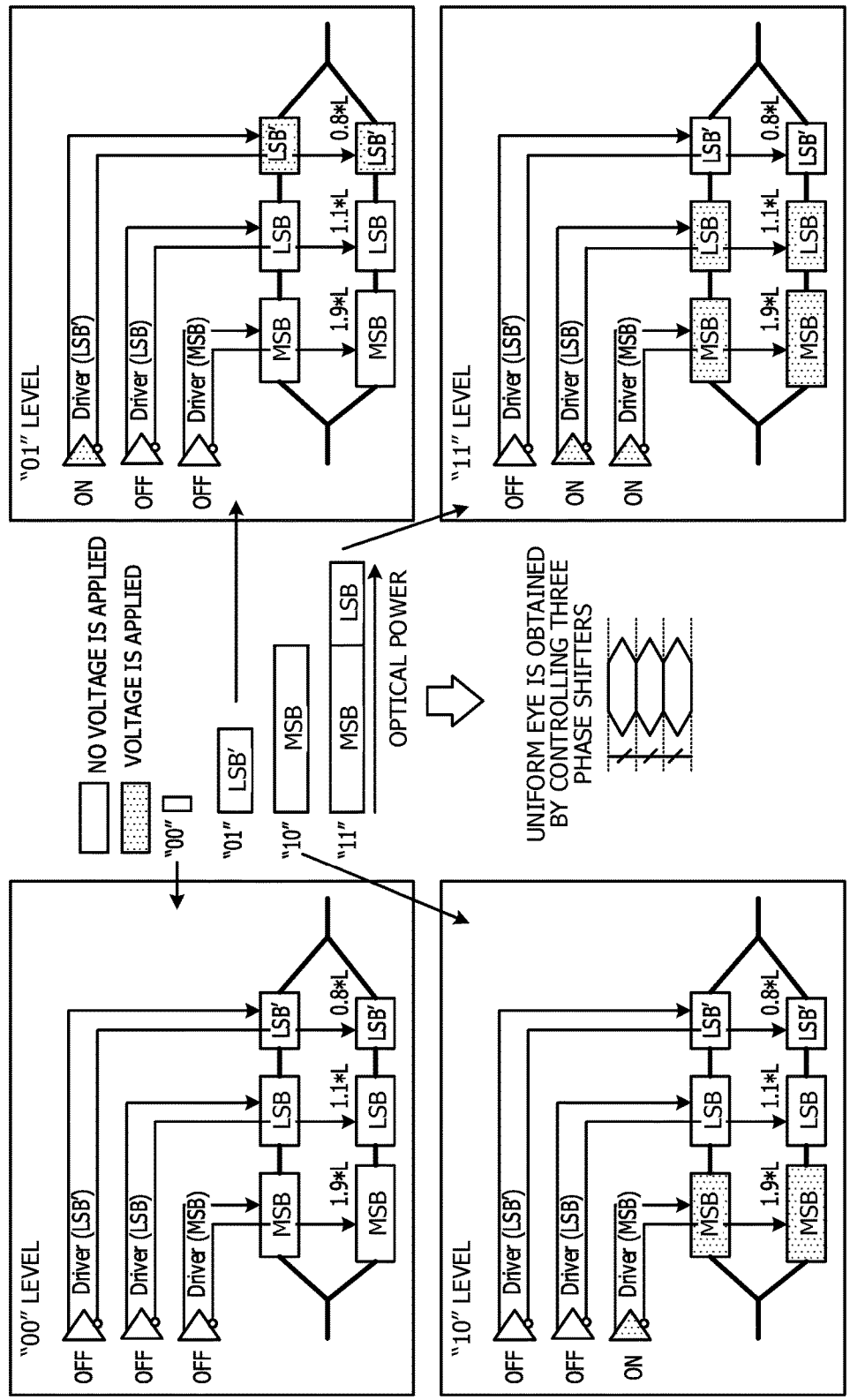
FIG. 5 is a diagram schematically illustrating drive control of FIG. 4.

FIG. 5 is a diagram schematically illustrating the drive control table of FIG. 4. ON and OFF states of respective drivers that drive the phase shifter for MSB, the phase shifter for LSB, and the phase shifter for LSB' are each illustrated in association with an output level. A uniform eye pattern may be obtained by using the phase shifter for LSB and the phase shifter for LSB' differently between "11" level and "01" level.

In the configuration of FIGS. 3 to 5, non-linearity of phase characteristics with respect to input voltage is compensated, and uniform eye pattern may be achieved. However, loss increases due to addition of the phase shifters 205a, 205b for LSB'. When it is assumed that the length of a phase shifter and loss are in proportional, and let 3.0×L be the line length of a phase shifter which achieves a desired output level, due to the addition of the phase shifters 205a, 205b for LSB', the total line length of the phase shifters is 3.8×L, and the loss is increased to 1.26 times.

In order to compensate the loss, a direct current (DC) output of a light source (LD) may be increased. However, this approach is not desirable because of increase in the power consumption and a relationship with the upper limit of the LD output. In addition, the power consumption of the drivers is increased because the phase shifter for LSB and the phase shifter for LSB' are driven.

<Configuration of Embodiment>

Figure 6:
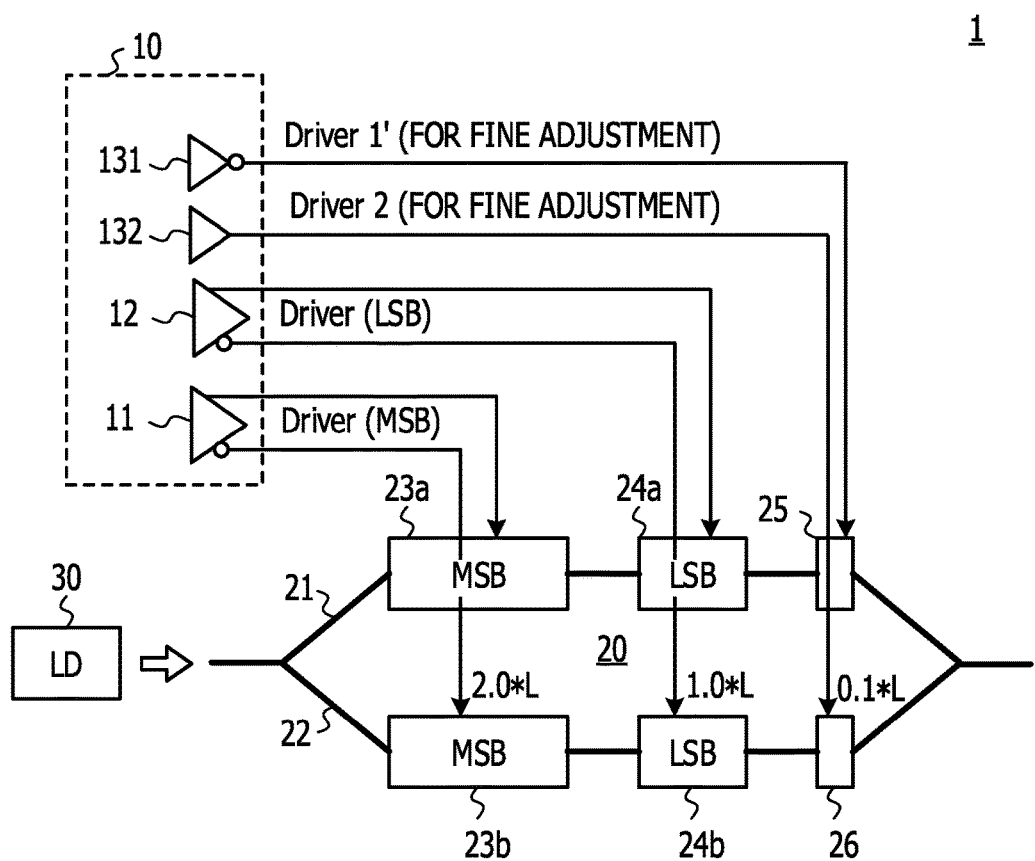
FIG. 6 is a schematic diagram of an optical modulator according to an embodiment.

FIG. 6 is a schematic diagram of an optical transmitter 1 according to an embodiment. In the embodiment, non-linearity of phase characteristics with respect to input power, or amplitude distortion is compensated with a lower power consumption and uniform eye pattern is obtained. In order to minimize the loss due to insertion of an additional phase shifter, as a phase shifter for fine adjustment, a phase shifter having a short line length is used, the phase shifter for fine adjustment compensating drop in the amount of phase change due to the non-linearity. The phase shifters for fine adjustment are individually driven, and thus the amount of phase shift is made adjustable in both a positive direction and a negative direction.

The optical transmitter 1 includes an MZ optical modulator 20, a drive circuit 10 that drives the optical modulator 20, and a laser diode (LD) 30 as the light source. The optical modulator 20 is driven by the drive circuit 10 with a drive voltage corresponding to a logical value of input data.

The optical modulator 20 has an upper arm including an optical waveguide 21 and a lower arm including an optical waveguide 22. A phase shifter 23a for MSB, a phase shifter 24a for LSB, and a phase shifter 25 for fine adjustment are disposed in the upper arm. A phase shifter 23b for MSB, a phase shifter 24b for LSB, and a phase shifter 26 for fine adjustment are disposed in the lower arm.

The drive circuit 10 has drivers 11, 12, 131, and 132. The phase shifters 23a and 23b for MSB are driven by a normal phase output and a reversed output of the driver 11. The phase shifters 24a and 24b for LSB are driven by a normal phase output and a reversed output of the driver 12. The phase shifter 25 for fine adjustment is driven by the driver 131 for fine adjustment. The phase shifter 26 for fine adjustment is driven by the driver 132 for fine adjustment. The polarity of a drive signal is changeable by each of the drivers 131 and 132, and the amount of phase change of the phase shifters 25, 26 for fine adjustment, in short, the optical output power level is adjustable in both a positive direction and a negative direction by each of the drivers 131 and 132. The driver 131 and the driver 132 individually drive the phase shifters 25 and 26 for fine adjustment in a positive direction or a negative direction to achieve uniform opening of four-level eye pattern by the optical modulator 20.

The length of the phase shifters 23a, 23b for MSB and the length of the phase shifters 24a, 24b for LSB are set to 2.0×L and 1.0×L, respectively in consideration of drop in the amount of phase change due to the non-linearity of phase characteristics with respect to input voltage. The phase shifter 25 for fine adjustment and the phase shifter 26 for fine adjustment are both set to 0.1×L.

FIG. 7 is a table illustrating drive control of the optical transmitter 1 when four levels are achieved by the configuration of FIG. 6. The phase shifters 23a, 23b for MSB are driven when a high potential or "1" is outputted with a higher-order bit. The phase shifters 24a, 24b for LSB are driven when a high potential or "1" is outputted with a lower-order bit.

The phase shifters 25 and 26 for fine adjustment are used for adjustment of the optical output power at an intermediate level. In the example of FIG. 7, when "10" level is outputted, in addition to the drive of the phase shifters for MSB, both the phase shifter 25 for fine adjustment and the phase shifter 26 for fine adjustment are driven. The phase shifters 25 and 26 for fine adjustment are both driven in a negative direction, and each provide a phase change amount of $0.03\varphi$ in a negative direction. A total of $0.06\varphi$ phase shift is given in a negative direction, and thus a target phase shift amount of $1.33\varphi$ is achieved.

When "01" level is outputted, in addition to the phase shifter for LSB, the phase shifter 25 for fine adjustment is driven. The phase shifter 25 for fine adjustment is driven in a negative direction, and $0.03\varphi$ phase change is given in a negative direction, and thus a target phase shift amount of $0.66\varphi$ is achieved.

In FIG. 7, the phase shifters 25 and 26 for fine adjustment are used only for adjustment of an intermediate level. However, the phase shifters 25 and 26 for fine adjustment may be used for output adjustment to "11" level. If uniform eye pattern between four levels is obtained, the output levels of both "10" level and "01" level may not be adjusted, and it is sufficient that one of the output levels be adjusted. Since the phase change amounts of two small phase shifters are individually controllable in both a positive direction and a negative direction, the number of phases shifters to be driven and a drive direction are adjusted according to a state of amplitude distortion, and fine compensation control is made possible.

FIG. 8 is a diagram illustrating the control of optical output power by the phase shifter 25 and/or 26 for fine adjustment. The drivers 11 and 12 driven, and the phase shifters 23a, 23b for MSB, and the phase shifters 24a, 24b for LSB are in ON state. This state corresponds to an operation state for output of "11" level. When a desired eye pattern is obtained only by the phase shifters 23a, 23b for MSB, and the phase shifters 24a, 24b for LSB, the phase shifters 25, 26 for fine adjustment may not be used. In this case, the drive operation of the drivers 131 and 132 are OFF. When a desired eye pattern is not obtained, at least one of the drivers 131 and 132 for fine adjustment is turned ON, and at least one of the phase shifters 25, 26 for fine adjustment is driven.

For instance, the driver 131 is turned ON, and the phase shifter 25 for fine adjustment is driven. Let V1 be a vector of light which transmits the upper arm, V2 be a vector of light which transmits the lower arm, and V3 be a vector after wave composition. The amount of phase shift of the phase shifter 25 for fine adjustment is finely adjusted in a negative direction, and the optical output power may be reduced (lower left of FIG. 8). The optical output power may be increased by finely adjusting the amount of phase shift of the phase shifter 25 for fine adjustment in a positive direction (lower right of FIG. 8).

Figure 9:
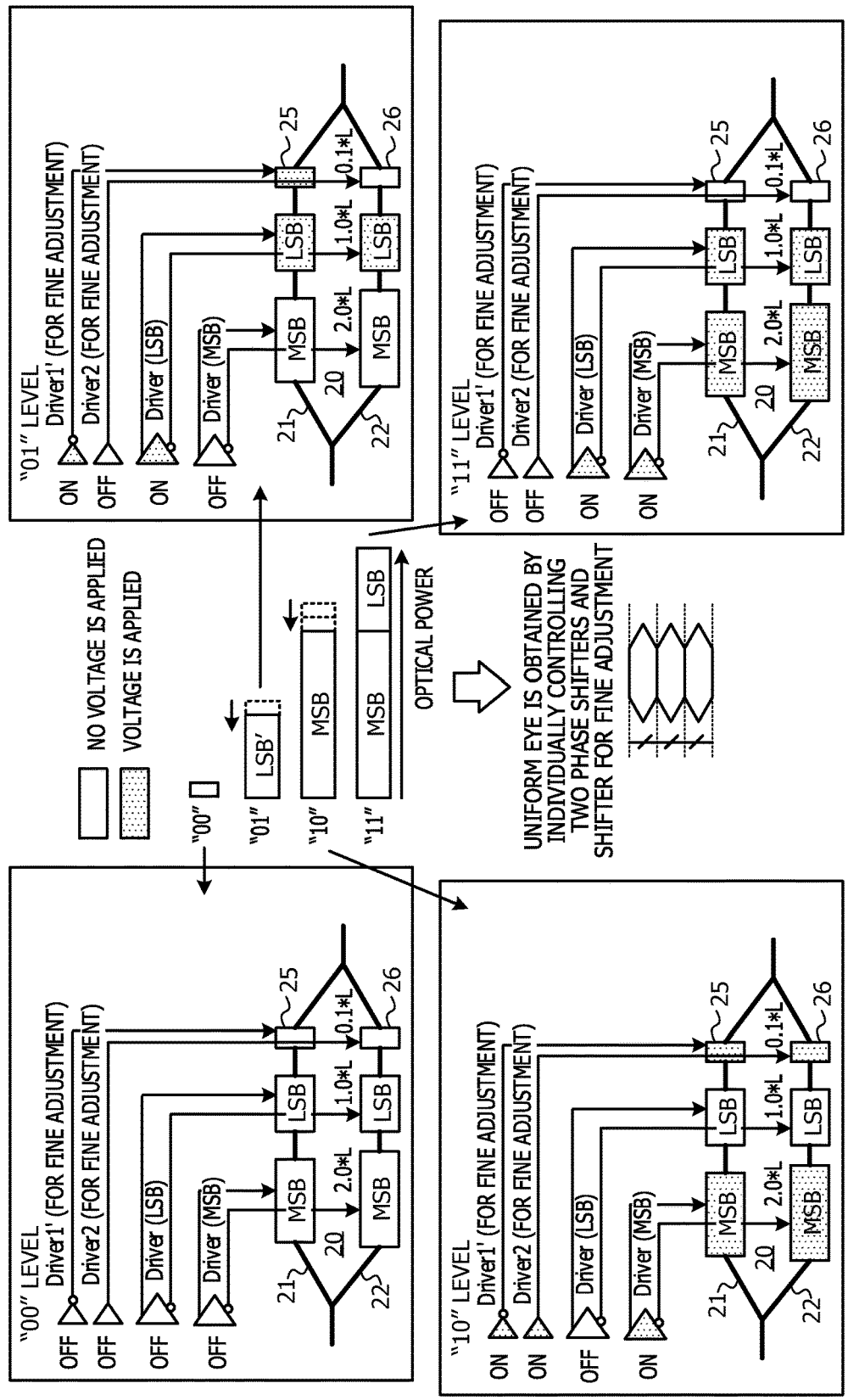
FIG. 9 is a diagram schematically illustrating drive control of FIG. 7.

FIG. 9 is a diagram schematically illustrating the drive control table of FIG. 7. ON and OFF states of respective drivers that drive the phase shifter for MSB, the phase shifter for LSB, and the phase shifters 25 and 26 for fine adjustment are each illustrated in association with an output level. For output of a signal level corresponding to the logical value "00", all the drivers are turned OFF, and the optical output power has a minimum based on FIG. 7. For output of a signal level corresponding to the logical value "01", the phase shifters for LSB and the phase shifter 25 for fine adjustment disposed in the optical waveguides 21 and 22 are driven. The amount of phase shift obtained by the phase shifters for LSB is adjusted by the phase shifter 25 for fine adjustment in a negative direction, thereby achieving an optical output power corresponding to "01" level. For output of a signal level corresponding to the logical value "10", the phase shifters for MSB and the phase shifters 25 and 26 for fine adjustment disposed in the optical waveguides 21 and 22 are driven. The amount of phase shift obtained by the phase shifters for MSB is adjusted by the phase shifters 25 and 26 for fine adjustment in a negative direction, thereby achieving an optical output power corresponding to "10" level. For output of a signal level corresponding to the logical value "11", the phase shifters for LSB and the phase shifters for MSB disposed in the optical waveguides 21 and 22 are driven. Thus, the light beams transmitting the optical waveguides 21 and 22 are in phase and intensify each other, and the optical output power has a maximum.

In the configuration of the embodiment illustrated in FIGS. 6 to 9, when it is assumed that the length of a phase shifter and loss are in proportional, the total line length of the phase shifters of the optical modulator 20 may be reduced to 3.1×L. The loss may be reduced to 0.82 times, as compared with the configuration (line length 3.8×L) of FIG. 3 devised in a process leading to the present disclosure.

The LD output for implementing 200 GBASE-DR4 standard is assumed to be approximately 13 dBm. 13 dBm is a value close to the limit of the LD output, and it is difficult to increase the LD output to compensate the loss which occurs in the configuration of FIG. 3. In contrast, in the configuration of the embodiment of FIG. 6, in order to compensate a slight loss due to an increase 0.1×L in the line length of the phase shifters, DC current injected into the LD is increased to 1.03 times (3.1/3.0). This is equivalent to an increase of 0.1 dBm in the LD output, and is in a feasible range.

In the configuration of the embodiment, use of the phase shifters 25 and 26 for fine adjustment is not limited to adjustment of an intermediate level, and the phase shifters 25 and 26 may be used for output adjustment to "11" level or "00" level as desired. Also, it is sufficient that the phase shifter for fine adjustment be disposed in at least one of the optical waveguides 21 and 22, and both optical waveguides do not have to include respective phase shifters for fine adjustment. Also in this case, the drive polarity of the driver which drives the phase shifter for fine adjustment is adjustable in both a positive direction and a negative direction. The number of phase shifters for fine adjustment disposed in one optical waveguide is not limited to one, and two or more phase shifters for fine adjustment may be individually drive-controlled by separate drivers.

In order to adjust each output level in four levels more accurately, at least one of the phase shifters 25, 26 for fine adjustment may be further sub-divided. Although the number of drivers increases according to the number of phases shifter for fine adjustment, each driver is a circuit which drives a small phase shifter, thus the driver may be implemented by a driver circuit having a low output.

Figure 10:
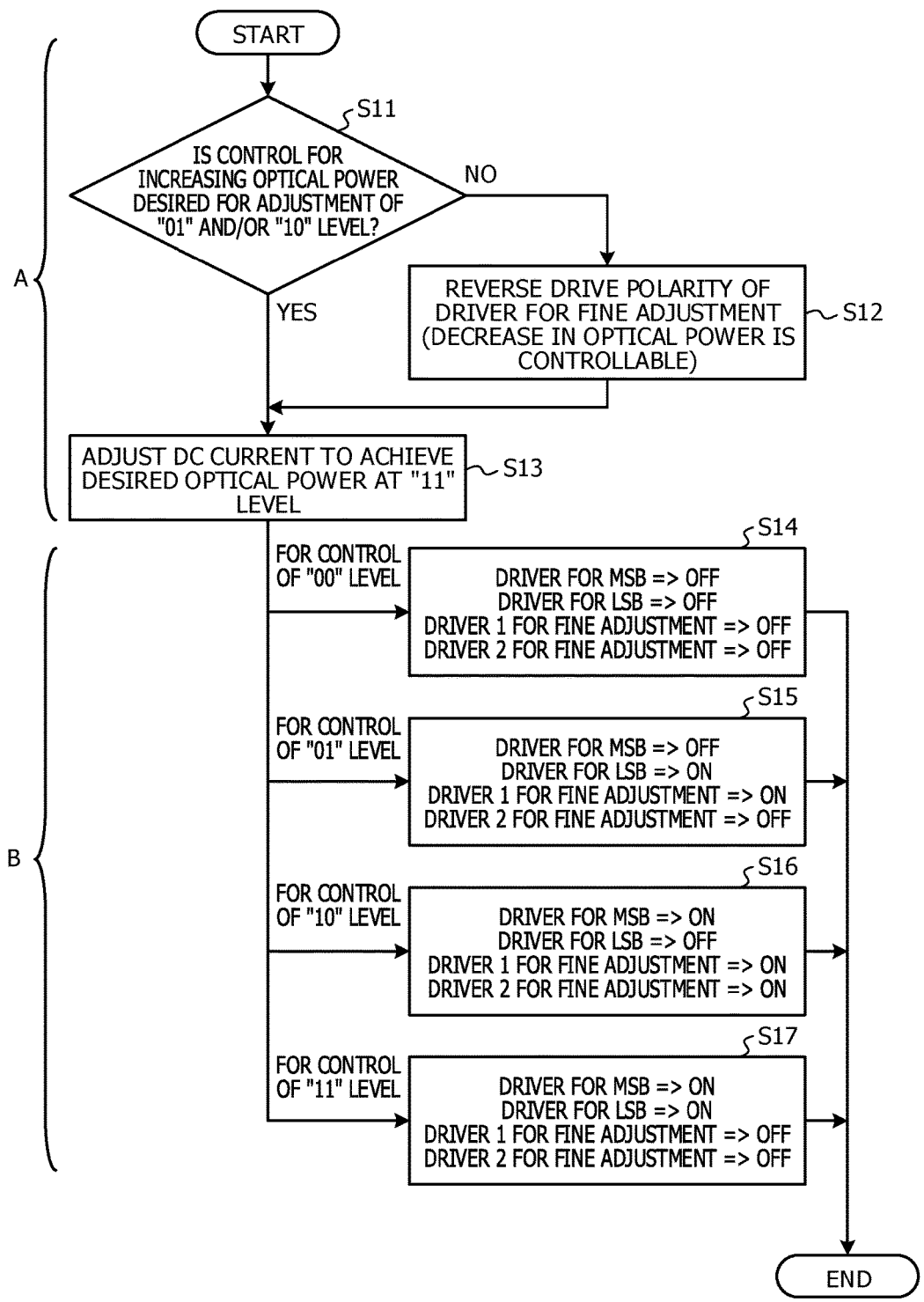
FIG. 10 is a flowchart of drive control of the optical modulator.

FIG. 10 is a flowchart of drive control of the optical transmitter 1. It is assumed that before the drive control of FIG. 10 is performed, non-linear characteristics of the optical modulator are measured, and a division ratio between the phase shifters, and the length and the number of phase shifters for fine adjustment are determined. Non-linear characteristics of the optical modulator are obtained by measuring the amount of phase change and the optical output power while increasing an input voltage to the optical modulator. A ratio of the length of the phase shifter for MSB to the length of the phase shifter for LSB, and the length of the phase shifters for fine adjustment are determined according to a degree of deviation from the linear characteristics at a voltage value corresponding to a maximum optical output level. The number of phase shifters for fine adjustment and install positions are determined as desired, and a desirable number of drivers are installed.

The optical modulator has phase shifters for fine adjustment is driven at each logical value, and when an output value at "01" level and/or "10" level is adjusted, it is determined whether or not control for increasing the optical output power is desired (S11). When control for increasing the optical output power is desired, the control may be addressed by the current drive polarity of the driver for fine adjustment, thus the flow proceeds to step S13, and the direct current (DC) of the LD is adjusted so that a desired optical output power is obtained at the time of a maximum output level (for instance, "11" level).

When control for increasing the optical output power is not desired (NO in S11), the drive polarity of the driver for fine adjustment is reversed to enable control for decreasing the optical output power (S12). Subsequently, the flow proceeds to step S13, and the DC current value of the LD is adjusted. Up to here is processing A in the stage before operation (during shipment, startup, or the like).

Processing B during operation includes steps S14 to S17. One of steps S14 to S17 is performed according to the logical value of an input signal. For control of "00" level, all of the driver 11 for MSB, the driver 12 for LSB, the driver 131 for fine adjustment (denoted as the driver 1 for fine adjustment in FIG. 10), and the driver 132 for fine adjustment (denoted as the driver 2 for fine adjustment in FIG. 10) are turned OFF (S14). The MZ optical modulator circuit in the embodiment is designed such that when light beams transmitting the optical waveguides 21 and 22 are synthesized in a state where no electric field is applied to the phase shifter, two light waves with reversed phases cancel each other, and the optical output is zero. At this point, the optical output power has a minimum.

For control of "01" level, the driver for MSB is turned OFF, the driver for LSB and the driver 1 for fine adjustment are turned ON, the driver 2 for fine adjustment is turned OFF (S15). The magnitude of the electric field applied to the optical modulator in the "01" level output is adjusted by the driver 1 for fine adjustment, and the openings of four-level eye pattern are uniformized.

For control of "10" level, the driver for MSB is turned ON, the driver for LSB is turned OFF, the driver 1 for fine adjustment and the driver 2 for fine adjustment are turned ON (S16). The magnitude of the electric field applied to the optical modulator in the "10" level output is adjusted by the driver 1 for fine adjustment and the driver 2 for fine adjustment, and the openings of four-level eye pattern are uniformized.

For control of "11" level, the driver for MSB and the driver for LSB are turned ON, and the driver 1 for fine adjustment and the driver 2 for fine adjustment are turned OFF (S17).

The optical transmitter 1 performs one of steps S14 to S17 according to a logical value inputted during operation (during communication), thus obtains a uniform waveform in the four-level eye pattern.

Steps S11 to S13 of FIG. 10 may be performed each time of start-up or on a regular basis. This is because the characteristics of the optical modulator 20 may change over time. Depending on obtained results of measurement before the determination in step S11, for output adjustment of an intermediate level, adjustment may be made, for instance, either one of the phase shifters 25 and 26 for fine adjustment is turned ON, or the drive polarity of the driver for fine adjustment is changed.

EXAMPLE 1

FIGS. 11A to 15 illustrate an optical transmitter 2 of Example 1. In Example 1, a division ratio between the phase shifters, and the number and the length of phase shifters for fine adjustment are determined by simulation based on the results of measurement of non-linear characteristics.

Figure 11A:
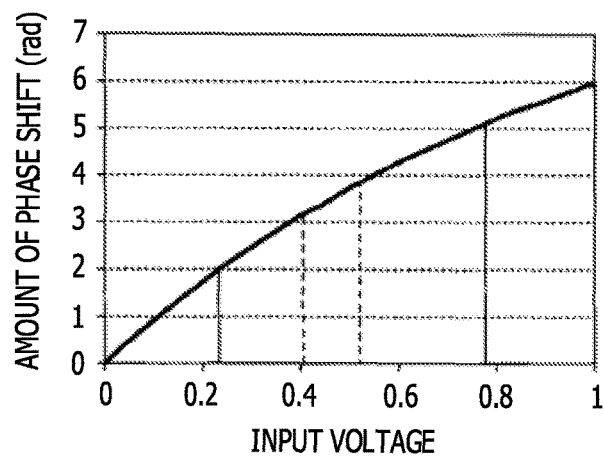
FIGS. 11A and 11B are each a graph illustrating adjustment of an eye pattern of Example 1.
Figure 11B:
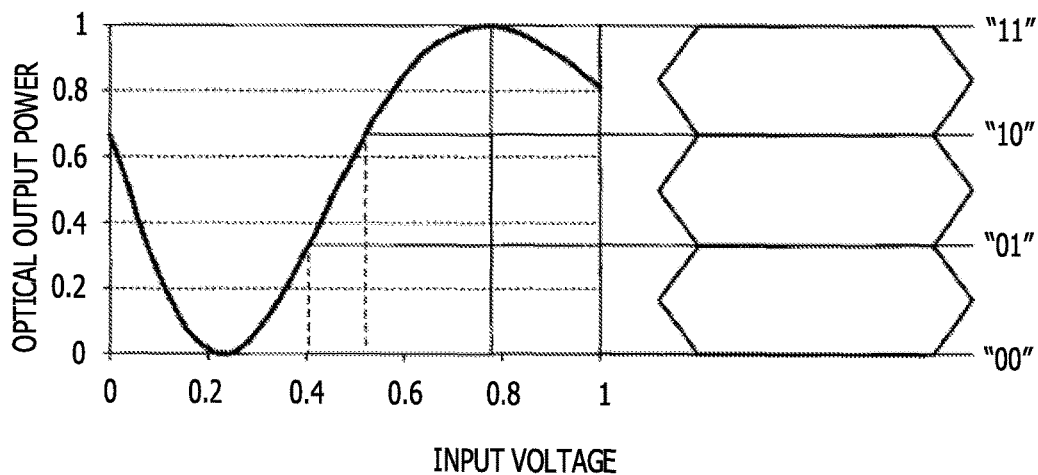

FIGS. 11A and 11B are each a graph illustrating adjustment of an eye pattern of Example 1. In an optical modulator having non-linear phase characteristics with respect to input voltage, similarly to FIGS. 1 and 2, even when the magnitude of input voltage is uniformly distributed, the openings of the eye pattern are not uniformized. Thus, the input voltage value is adjusted so that the openings of the eye pattern are uniformized. In FIGS. 11A and 11B, input voltage values corresponding to "01" level and "10" level serving as intermediate values are adjusted, and particularly, the amount of adjustment on "10" level is large.

FIGS. 12A and 12B are each a table illustrating parameters of the optical modulator before adjustment of input voltage and after adjustment of input voltage. The length of FIG. 12A indicates before adjustment, and the table of FIG. 12B indicates after adjustment. In the state before adjustment indicated by the table of FIG. 12A, the input voltages are set to be substantially uniform between output levels. However, the power level of the optical output is not uniformized. "Δ optical output", which indicates a difference between adjacent output levels, is varied, and particularly, the difference between "11" level and "10" level is small. This causes an error on the receiving side.

Thus, as illustrated in the table of FIG. 12B, the amount of phase change is adjusted so that the difference (Δ optical output) between output levels is uniform. The amount of phase change at "10" level is adjusted in a negative direction so that the difference in the optical output power between "10" level and "11" level is increased. The amount of phase change at "01" level is also adjusted in a negative direction so that the optical output power level between four levels is uniformized.

When the amount of phase change is adjusted in a negative direction as in the table of FIG. 12A and the table of FIG. 12B, the length of the phase shifter for fine adjustment for adjusting "10" level and "01" level is calculated. Let $L_{10adj}$ be the length of the phase shifter for fine adjustment at "10" level, $L_{01adj}$ be the length of the phase shifter for fine adjustment at "01" level, 2.0×L be the length of the phase shifter for MSB, and 1.0×L be the length of the phase shifter for LSB.

$L_{10adj}$=(2.0×L+1.0×L)×[1−(amount of phase change before adjustment)/(amount of phase change after adjustment)]=3.0×L×[1−(3.82/4.23)]= 0.27×L $L_{01adj}$=(2.0×L+1.0×L)×[1−(amount of phase change before adjustment)/(amount of phase change after adjustment)]=3.0×L×[1−(3.19/3.15)]= 0.03×L Here, when the result of calculation of the length of the phase shifter for fine adjustment at "10" level, and the length of the phase shifter for fine adjustment at "01" level has the relationship of 2:1 (for instance, 0.2×L and 0.1×L), the phase shifters 25, 26 for fine adjustment are disposed as illustrated in FIG. 6, and the operation logical illustrated in FIG. 7 is assigned.

Figure 13:
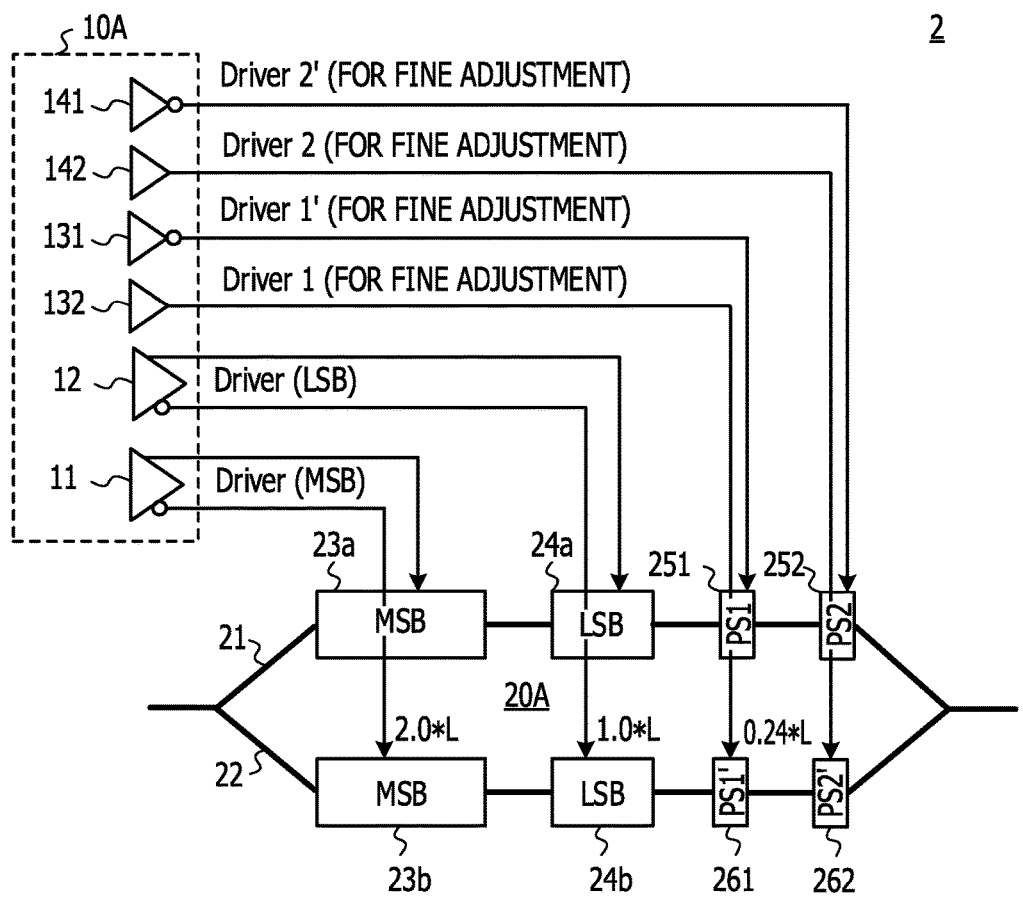
FIG. 13 is a diagram illustrating an example of division of phase shifters for fine adjustment in an optical modulator of Example 1.

In Example 1, since the length of the phase shifter for fine adjustment at "10" level is 0.27×L, and the length of the phase shifter for fine adjustment at "01" level is 0.03×L, 4 (=2×2) phase shifters for fine adjustment are disposed as illustrated in FIG. 13.

FIG. 13 is a diagram illustrating an example of division of phase shifters for fine adjustment in the optical transmitter 2 of Example 1. The optical transmitter 2 has an MZ optical modulator 20A, and a drive circuit 10A that drives the optical modulator 20A. The optical modulator 20A has an upper arm including an optical waveguide 21 and a lower arm including an optical waveguide 22. A phase shifter 23a for MSB, a phase shifter 24a for LSB, and phase shifters 251, 252 for fine adjustment are disposed in the upper arm. A phase shifter 23b for MSB, a phase shifter 24b for LSB, and phase shifters 261, 262 for fine adjustment are disposed in the lower arm. The drive circuit 10A has drivers 11, 12, 131, 132, 141, and 142. The phase shifters 251, 253, 261, 262 for fine adjustment are independently drive-controlled by drivers 131, 132, 141, and 142.

The length of the phase shifters 23a, 23b for MSB and the length of the phase shifters 24a, 24b for LSB are set to 2.0×L and 1.0×L, respectively in consideration of drop in the amount of phase change due to the non-linearity of phase characteristics with respect to input voltage. The length of the phase shifter 251 for fine adjustment (denoted as "PS1" in FIG. 13) and the phase shifter 261 for fine adjustment (denoted as "PS1'" in FIG. 13) is set to 0.24×L (0.27L− 0.03L). The length of the phase shifter 252 for fine adjustment (denoted as "PS2" in FIG. 13) and the phase shifter 262 for fine adjustment (denoted as "PS2'" in FIG. 13) is set to 0.03×L. The phase shifters for fine adjustment are divided into two and each halves are disposed in each arm, and the phase shifters for fine adjustment to be used for adjustment at "10" level and "01" level are differently utilized between "10" level and "01" level, and thus openings of four-level eye pattern may be uniformized.

FIG. 14 is a table illustrating drive control of the optical modulator 20A when four levels are achieved by the configuration of FIG. 13. The phase shifters 23a, 23b for MSB are driven when a high potential or "1" is outputted with a higher-order bit. The phase shifters 24a, 24b for LSB are driven when a high potential or "1" is outputted with a lower-order bit. The phase shifters 251, 252, 261, and 262 for fine adjustment are used for adjustment of the optical output power at an intermediate level.

When "11" level is outputted, the phase shifter for MSB and the phase shifter for LSB are turned ON, and the phase shifters 251, 252, 261, and 262 for fine adjustment are turned OFF.

When "10" level is outputted, in addition to the phase shifter for MSB, the phase shifters 251, 252, 261, and 262 for fine adjustment are driven. All the drivers 131, 132, 141, and 142 that drive the phase shifters 251, 252, 261, and 262 for fine adjustment are set to reversed outputs, and the optical output power is adjusted in a negative direction. All the phase shifters for fine adjustments are driven, and thereby the amount of phase change in a negative direction, achieved by a phase shifter length of 0.27×L is given to the optical modulator 20A.

When "01" level is outputted, in addition to the phase shifter for LSB, the phase shifters 252 (PS2) and 262 (PS2') for fine adjustment is driven. The phase shifters 252, 262 for fine adjustment are driven, and thereby the amount of phase change in a negative direction, achieved by a phase shifter length of 0.03×L is given to the optical modulator 20A.

When "00" level is outputted, all the phases shifters are in OFF state. With the configuration of FIG. 14, the phase change amounts of 2×2 small phase shifters are individually controllable in both a positive direction and a negative direction, and thus the number of phases shifters to be driven and a drive direction are adjusted according to a state of amplitude distortion, and fine compensation control is made possible.

In configuration of Example 1, the total length of the phase shifters is 3.27×L. When amplitude distortion is compensated using the same simulation parameter as in Example 1, the configuration of FIG. 3, and the drive method of FIG. 4, the length of the phase shifter for MSB is 1.73×L, the length of the phase shifter for LSB is 1.27×L, and the length of the phase shifter for LSB' is 0.97×L. The total length of phase shifters is 3.97×L. Using the configuration and method of Example 1, it is possible to drive the optical modulator 20A with less amount of loss, in other words, with less power consumption.

<Another Example of Division of Phase Shifters>

Figure 15:
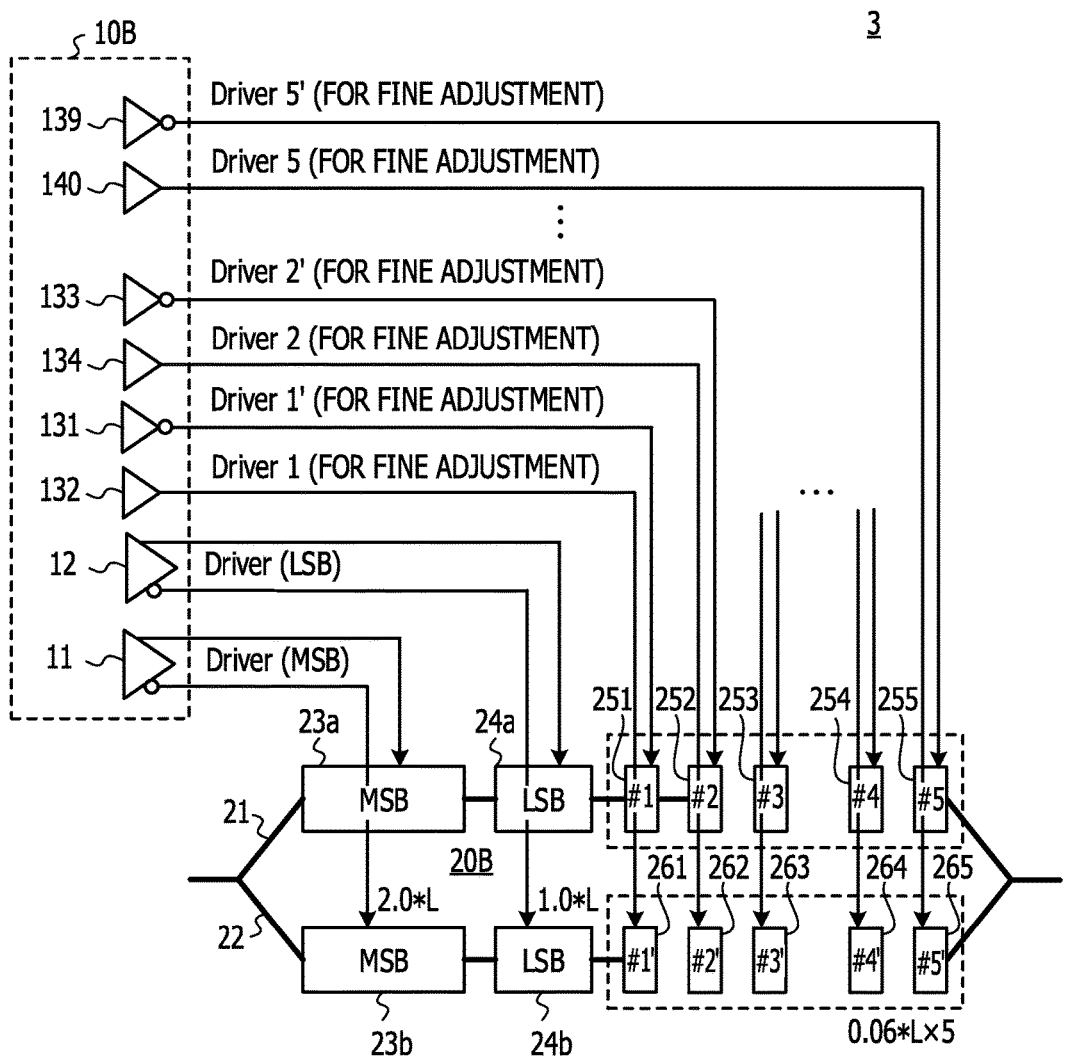
FIG. 15 is a diagram illustrating another example of division of phase shifters for fine adjustment.

FIG. 15 illustrates another example of division of phase shifters for fine adjustment. An optical transmitter 3 of FIG. 15 has an optical modulator 20B, and a drive circuit 10B. It is presumed that a desired amount of phase adjustment varies with optical modulator due to a variation in modulator characteristics. Thus, sub-divided phase shifters for fine adjustment are prepared in advance.

The optical modulator 20B has an upper arm including an optical waveguide 21 and a lower arm including an optical waveguide 22. A phase shifter 23a for MSB, a phase shifter 24a for LSB, and a phase shifter 250 for fine adjustment are disposed in the upper arm, the phase shifter 250 being divided into n pieces (n is an integer greater than or equal to 2). A phase shifter 23b for MSB, a phase shifter 24b for LSB, and a phase shifter 260 for fine adjustment are disposed in the lower arm, the phase shifter 260 being divided into n pieces (n is an integer greater than or equal to 2).

In this example, the phase shifter 250 for fine adjustment is divided into five segments 251 to 255 (#1 to #5), and the length of one segment is 0.06×L. The entire length of the phase shifter 250 for fine adjustment is 0.3×L. Similarly, the phase shifter 260 for fine adjustment is divided into five segments 261 to 265 (190 1' to #5'), the length of one segment is 0.06×L, and the entire length of the phase shifter 260 for fine adjustment is 0.3×L.

The drive circuit 10B has drivers 11, 12, and 131 to 140. The segments 251 to 255 and 261 to 265 of the phase shifters 250 and 260 for fine adjustment are independently drive-controlled by drivers the drivers 131 to 140. The drive polarity of the drivers 131 to 140 is changeable.

Non-linear characteristics of the optical modulator 20B are measured, and control polarities of the segments of the phase shifters 250 and 260 for fine adjustment, that is, drive polarities of the drivers 131 to 140 are determined in accordance with steps S11 to S13 of FIG. 10.

FIG. 16 is a table illustrating drive control of the optical modulator 20B when four levels are achieved by the configuration of FIG. 15. The phase shifters 23a, 23b for MSB are driven when a high potential or "1" is outputted with a higher-order bit. The phase shifters 24a, 24b for LSB are driven when a high potential or "1" is outputted with a lower-order bit. The segments 251 to 255 (190 1 to #5) of the phase shifter 250 for fine adjustment, and the segments 261 to 265 (#1' to #5') of the phase shifter 260 for fine adjustment are used for adjustment of the optical output power at an intermediate level.

When "11" level is outputted, the phase shifter for MSB and the phase shifter for LSB are turned ON, and the phase shifters 250, 260 for fine adjustment are turned OFF.

When "10" level is outputted, in addition to the drive of the phase shifters for MSB, 190 1', #2 to #5, and #2' to #5' of the segments of the phase shifters 250, 260 for fine adjustment are driven in a negative direction. This gives the amount of phase change corresponding to a shift length of 0.27×L (0.06L/2+0.06L×4) in a negative direction.

When "01" level is outputted, in addition to the phase shifter for LSB, 190 1 of the segments of the phase shifters 250, 260 for fine adjustment is driven in a negative direction. This gives the amount of phase change corresponding to a shift length of 0.03×L in a negative direction.

When "00" level is outputted, all the phases shifters are in OFF state. With the configuration of FIG. 15, the sub-divided segments of the phase shifters 250, 260 for fine adjustment are individually controllable in both a positive direction and a negative direction, and thus the number of phases shifters to be driven and a drive direction are adjusted according to a state of amplitude distortion, and fine compensation control is made possible.

The number of divided segments of the phase shifters 250, 260 for fine adjustment, and a drive pattern are determined according to an adjustment amount of the optical modulator 20B, and for instance, the group of segments 190 1 and #2, and the group of #3 to #5 may be used differently, or the phase shifters 250, 260 may be divided into five or more segments. Also, the number of divisions may different between the upper arm and the lower arm. For instance, the phase shifter 250 for fine adjustment of the upper arm may be equally divided into five pieces, and the phase shifter 260 for fine adjustment of the lower arm may be divided into two pieces with a length ratio of 2 to 3.

In this manner, with the optical modulators 20, 20A, and 20B and the optical transmitters 1 to 3 using respective optical modulators in the embodiment, amplitude distortion of eye pattern in multi-level modulation may be compensated while avoiding an increase in the power consumption.

The configuration and the technique in the embodiment is not limited to four-level optical modulation, and is applicable to eight-level, 16-level, or still higher multi-level modulation. For instance, in addition to the phase shifter for MSB, and the phase shifter for LSB, a phase shifter, which controls a logical value for an intermediate bit, is disposed, and a short phase shifter for fine adjustment, or a segmented phase shifter for fine adjustment is individually controlled, and the optical output power may be adjusted.

In the embodiment, the length of each phase shifter for fine adjustment has been set to $\frac{1}{10}$ to $\frac{1}{3}$ of the length of each phase shifter for LSB, however, may be a length out of the above-mentioned range depending on the non-linear characteristics of the optical modulator.

The optical modulator in the embodiment is also applicable to an MZ modulator using a compound semiconductor such as InP, in addition to an MZ modulator formed of silicon thin line waveguide. In addition, the optical modulator 20 of FIG. 6 may be connected in parallel, and may be applied to QAM-x modulation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmitter comprising:
    an optical modulator that includes a first wavequide and a second wavequide;
    a first phase shifter for a most significant bit, a second phase shifter for a least significant bit, and a third phase shifter for fine adjustment, the first phase shifter, the second phase shifter, and the third phase shifter being disposed along the first optical waveguide;
    a fourth phase shifter for a most significant bit, a fifth phase shifter for a least significant bit, and a sixth phase shifter for fine adjustment, the fourth phase shifter, the fifth phase shifter, and the sixth phase shifter being disposed along the second optical waveguide;
    a first driver that drives the first phase shifter and the fourth phase shifter;
    a second driver that drives the second phase shifter and the fifth phase shifter;
    a third driver that drives the third phase shifter; and
    a fourth driver that drives the sixth phase shifter, wherein a drive polarity of the third driver is adjustable in a positive direction and a negative direction, and the third phase shifter adjusts an amount of phase change of the optical modulator in a positive direction or a negative direction based on a drive voltage inputted from the third driver, and a drive polarity of the fourth driver is adjustable in a positive direction and a negative direction, and the sixth phase shifter adjusts the amount of phase change of the optical modulator in a positive direction or a negative direction based on a drive voltage inputted from the fourth driver.

2. The optical transmitter according to claim 1, wherein the third phase shifter is divided into a plurality of segments, the third driver includes a plurality of drivers respectively for the plurality of segments, and the optical modulator performs four-level modulation, when a logical value "10" level is outputted, the first driver, and all of the plurality of segments of the third driver and the fourth driver are driven, and when a logical value "01" level is outputted, the second driver, and part of the plurality of segments of the third driver and the fourth driver are driven.

3. The optical transmitter according to claim 1, wherein a ratio of a length of the first phase shifter to a length of the second phase shifter is 2:1, and a length of the third phase shifter is $1/10$ to $1/3$ of the length of the second phase shifter.

* * * * *